United States Patent [19]

Altschuler

[11] 3,853,770

[45] Dec. 10, 1974

[54] FABRIC SOFTENER COMPOSITIONS

[75] Inventor: Lili W. Altschuler, Wynnewood, Pa.

[73] Assignee: E. I. du Pont de Nemours and Company, Wilmington, Del.

[22] Filed: July 22, 1971

[21] Appl. No.: 165,363

Related U.S. Application Data

[63] Continuation-in-part of Ser. No. 53,312, July 8, 1970, abandoned, which is a continuation-in-part of Ser. No. 846,615, July 31, 1969, abandoned.

[52] U.S. Cl. ........ 252/8.8, 117/139.5 CQ, 252/528, 252/529, 252/547, 252/548, 260/570, 260/570.6, 260/570.7, 260/584

[51] Int. Cl. ...................... D06m 13/38, C11d 1/00

[58] Field of Search ........... 252/8.8, 547, 548, 529, 252/528; 117/139.5 CQ, 139.5 A

[56] References Cited
UNITED STATES PATENTS

| | | | |
|---|---|---|---|
| 2,454,544 | 11/1948 | Bock et al. | 252/342 X |
| 2,640,037 | 5/1953 | Parry et al. | 260/830 |
| 2,819,222 | 1/1958 | DeGroote et al. | 252/344 |
| 2,819,223 | 1/1958 | DeGroote et al. | 252/344 |
| 3,078,271 | 2/1963 | DeGroote et al. | 252/344 X |
| 3,102,839 | 9/1963 | Neracher et al. | 424/199 |
| 3,400,176 | 9/1968 | Quimby | 252/558 X |
| 3,515,698 | 6/1970 | Munz et al. | 260/75 |
| 3,697,423 | 10/1972 | Sundby et al. | 252/8.8 |

FOREIGN PATENTS OR APPLICATIONS

| | | |
|---|---|---|
| 699,130 | 11/1967 | Belgium |

*Primary Examiner*—Herbert B. Guynn

[57] ABSTRACT

Compositions suitable for use as fabric softeners to be added during the washing cycle during home laundering, comprising formulations containing surfactants and reaction products of specified epoxides and specified amines, acids, and alcohols. Disclosed fabric softeners include, for example, reaction products of higher alkyl or alkenyl secondary amines and epoxides selected from higher alkyl, alkenyl or aryl monoepoxides and alkylene or arylene diepoxides.

2 Claims, No Drawings

FABRIC SOFTENER COMPOSITIONS

RELATED APPLICATIONS

This application is a continuation-in-part of application Ser. No. 53,312, filed July 8, 1970, now abandoned, which is in turn a continuation-in-part of Ser. No. 846,615, filed July 31, 1969, now abandoned.

This invention relates to formulations suitable for use as fabric softeners which may be added to the washing cycle during home laundering.

The present invention is a composition comprising (a) an effective amount of a surface active agent to form an emulsion or dispersion with (b) in water (b) (hereinafter often referred to as active ingredient) at least one compound selected from the class of those having a formula selected from the class consisting of:

I
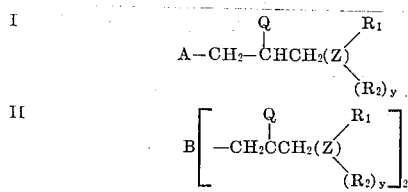

II wherein Z is selected from the class consisting of

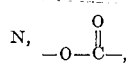

and $-O-CH_2$
wherein $Q$ = hydroxyl or

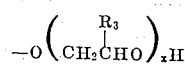

wherein
$x$ = 1 through 15 inclusive;
$R_3$ = H or alkyl having no more than about 3 carbon atoms
$R_1$ = alkyl or alkenyl having at least 13 carbon atoms and no more than about 40 carbon atoms;
with the proviso that when Z is

or $-OCH_2-$, $y$ is 0 and when Z is N, $y$ = 1 and
$R_2$ = alkyl or alkenyl having at least 13 carbon atoms and not more than about 40 carbon atoms;
A = alkyl having at least 10 carbon atoms and no more than about 20 carbon atoms; alkoxy having at least 10 carbon atoms and no more than about 20 carbon atoms; aryl having up to about 10 benzene rings; or aryloxy having up to about 10 benzene rings;
B = alkylene having at least 10 carbon atoms and no more than about 20 carbon atoms; aryl having up to about 10 benzene rings; or $-O-Y-O-$ or

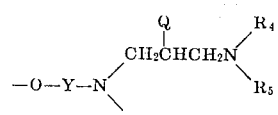

wherein:
Y = alkylene having at least 10 carbon atoms and no more than about 20 carbon atoms, or aryl having up to 10 benzene rings.
and $R_4$ and $R_5$ are each independently alkyl or alkenyl having at least 13 carbon atoms and not more than 40 carbon atoms.

Preferably, in this composition the compounds have a formula such that Q is hydroxyl (—OH). In one embodiment the composition is a suitable rinse additive (a fabric softener suitable for softening fabrics by addition to the rinsing cycle in ordinary home laundering) and may be prepared from quaternary ammonium derivatives of the aforementioned active ingredients wherein Z is (N) or amine salts thereof.

Most preferably, the active ingredient for softening is selected from the class of compounds of Formula II aforementioned wherein Z is (—N—) and

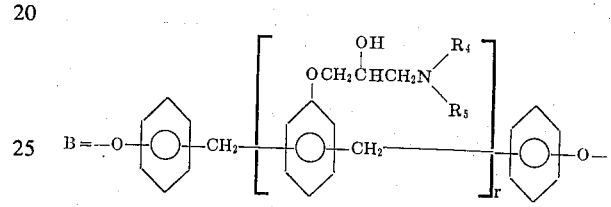

$r$ = 0 through 5 inclusive;
$R_4$ and $R_5$, if present, are each independently selected from alkyl or alkenyl having at least 13 carbon atoms and no more than about 40 carbon atoms.
and compounds such as those wherein the unit represented by B has the formula:

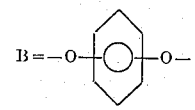

or

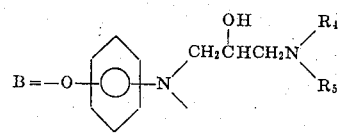

or

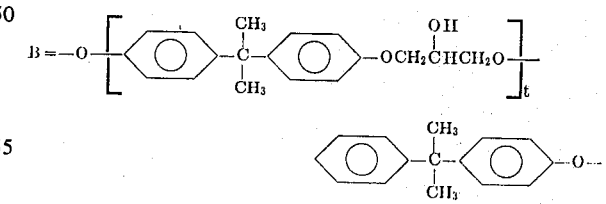

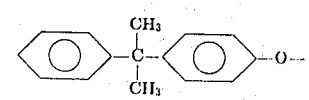

wherein:
$t$ = 0 through 4 inclusive.

In one embodiment the compound is such that it has the formula II in which

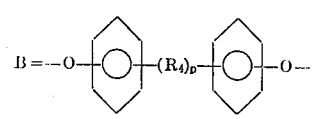

wherein:

$p = 0$ or 1;

$R_4$ = oxygen, sulfur, methylene, alkylene having up to about 20 carbon atoms, or aryl having up to about 10 benzene rings.

An alternative compound for the active ingredient is:

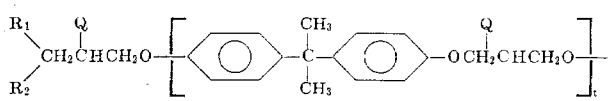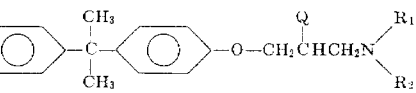

wherein:

$t = 0$ through 4 inclusive;

$R_1$ and $R_2$, if present, are each independently selected from alkyl or alkenyl having at least 13 carbon atoms and no more than about 40 carbon atoms;

wherein:

$R_3$ = H or alkyl having no more than about three carbon atoms;

$x = 1$ through 15 inclusive.

It is preferred that Q in both Formula I and Formula II be —OH— although substitution of —O(CH$_2$CHO)$_x$H group for Q makes the compound itself more easily dispersible.

Alkyl and alkenyl refer to those groupings in which carbon atoms are connected to —H or —C— only. Branched and alkyl or alkenyl substitutions are included with the above proviso.

The composition of the claimed invention usually will contain 10 to 38% of surfactant (a) by weight based on the weight of active ingredient (b) aforementioned and most preferably the surfactant is present in an amount of 10 to 25% by weight of active ingredient. This composition may be in a liquid or solid formulation and contain in addition a detergent or soap as well as a carrier liquid or carrier solids. In some formulation the detergent used in washing may be this surfactant. Formulations comprising all of these ingredients are included in the scope of the invention.

The degree of fabric softening and freedom from detergency interference as discussed hereinafter which will occur using the composition of the present invention will depend, of course, on the contents of the wash water in the washer, including the choice of detergent and the presence of other materials.

Without being bound thereby, it is thought that the present invention functions as a "wash additive" composition based on the delicate balance of the affinity of the compounds (active ingredient) for the liquid phase and precipitating tendency of the compound i.e. affinity of the compound for the solid phase (clothes) in the washing step. Similarly, without being bound thereby, it is believed that the presence of the long hydrocarbon groups at the end of the molecule contribute to the softening action. This delicate balance is thought to be in the main the result of the molecular weight and structure of the compound and the polarities involved in the groupings present. Although the amine compound where Z is —N— in Formula I and Formula II hereinbefore set forth is preferred, the main factor is thought to be the structure of the molecular as a whole.

It is desirable that the softeners of the present invention soften the fabrics and at the same time have minimal interference with the detergency action of the detergent in the washing step as shown in the Examples.

Selection of suitable surfactant for the active ingredient used, as shown in the Examples, should produce a composition which in use as aforementioned has minimal interference with the detergency action of the detergent in the washing step.

The amount of deposition of softener on the fabric is also dependent on detergent concentration, dispersion (as agitation) and the nature of the surface active agent. As aforementioned, the results accomplished by the present invention are predicated on maintaining a balance between the deposition propensity of the active ingredient on the substrate to which the softener is applied and the affinity of the active ingredient for the dispersing agent keeping the active ingredient dispersed in a liquid phase.

DETAILED DESCRIPTION OF THE INVENTION

The active ingredient (softener) can be made by known reaction techniques involving the reaction of a suitable amine, carboxylic acid or alcohol, with at least one epoxide in the presence, if desired, of a catalyst at a temperature and at a time sufficient to complete the reaction as will be known from the art. Most specifically, "Industrial and Engineering Chemistry" 48, page 86 and following (1956) teaches reactions and reaction conditions suitable to prepare species of the active ingredient of the present invention wherein Z is carboxyl

and —OCH$_2$—. For use in the present invention, monocarboxylic acids are suitable for reaction with the epoxides and acids having 16 to 24 carbon atoms as unsubstituted alkyl or alkenyl are preferred. While groupings in which the carbon chains may be branched are intended to be included, the carbon atoms are each connected to carbon or hydrogen only. The process for the preparation of the active ingredient derived from a monocarboxylic acid and epoxide may also be based on the teaching in U.S. Pat. No. 3,471,421.

Because it is desirable to minimize presence of reactive groups in the final product, that being the softened fabric, the acid, alcohol or amine and epoxide should be present in sufficient mol ratio to each other, whether it be acid, amine or alcohol to the epoxide so that substantially all of the epoxide groups have reacted and there is present a minimal excess, if any, of the amine, acid or alcohol.

Catalysts hasten the reactions (epoxide-carboxylic acid and epoxide alcohol) which may be sluggish without catalysts even at a temperature of 200°C. or higher. Bases such as alkali hydroxides, tertiary amines and quaternary hydroxides are effective catalysts, at a temperature between 100°–125°C. when present in the amount of 0.1–0.6% based on the weight of reactants. Acids as catalysts are not preferred; however, stannic chloride, a Lewis acid, may be a particularly effective catalyst for the reaction of the epoxide with suitable alcohol.

Methods suitable for preparing the active ingredient (fabric softening agent) of the present invention prepared from the specific secondary amines and epoxides can be learned from U.S. Pat. No. 2,819,222.

Among the secondary amines that are suitable for use in the present invention are those which are represented by the following formula:

wherein:
$R_1$ and $R_2$ are each independently selected from alkyl or alkenyl having at least 13 carbon atoms, and no more than about 40 carbon atoms.

Of course, to produce the fabric softeners of this invention, one may use any one of the secondary amines represented by the foregoing formula, or may use a mixture of any of the secondary amines that are represented by the foregoing formula.

Specific examples of secondary amines useful in this invention include:

 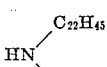 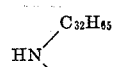
 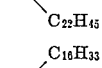 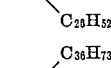
 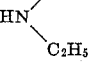 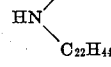
 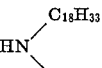 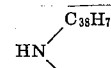
 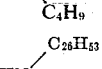 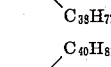
 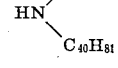

Particularly preferred secondary amines include a mixture of those derived from hydrogenated tallow fatty acids.

Among the epoxides that are suitable for use in the present invention are those which are represented by the formulas:

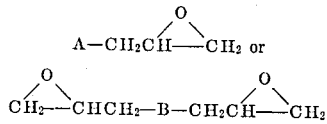

wherein:
A = alkyl having at least 10 carbon atoms and no more than about 20 carbon atoms; alkoxy having at least 10 carbon atoms and no more than about 20 carbon atoms; aryl having up to about 10 benzene rings; or aryloxy having up to about 10 benzene rings;

B = alkylene having at least 10 carbon atoms and no more than about 20 carbon atoms; aryl having up to about 10 benzene rings; or —O—Y—O— or

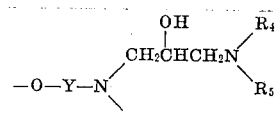

wherein:
Y = alkylene having at least 10 carbon atoms and no more than about 20 carbon atoms, or aryl having up to 10 benzene rings.

Of course, to produce the fabric softeners of this invention, one may use anyone of the epoxides represented by the foregoing formula, or may use a mixture of any of the epoxides that are represented by the foregoing formula.

Specific examples of epoxides useful in this invention include:

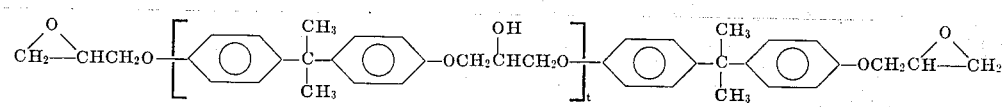

wherein:
$t$ = 0 through 4 inclusive, preferably 0–1.

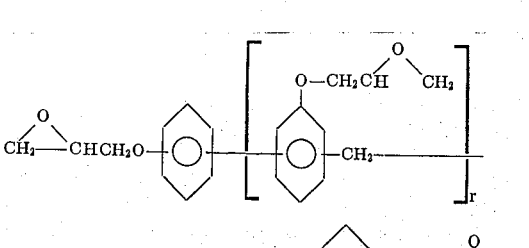

wherein:
$r$ = 0 through 5 inclusive.

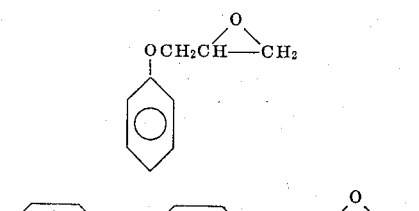

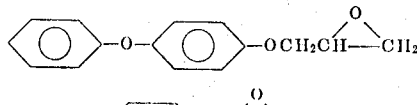

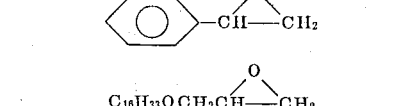

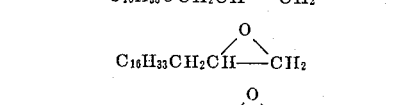

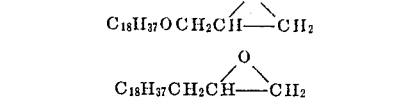

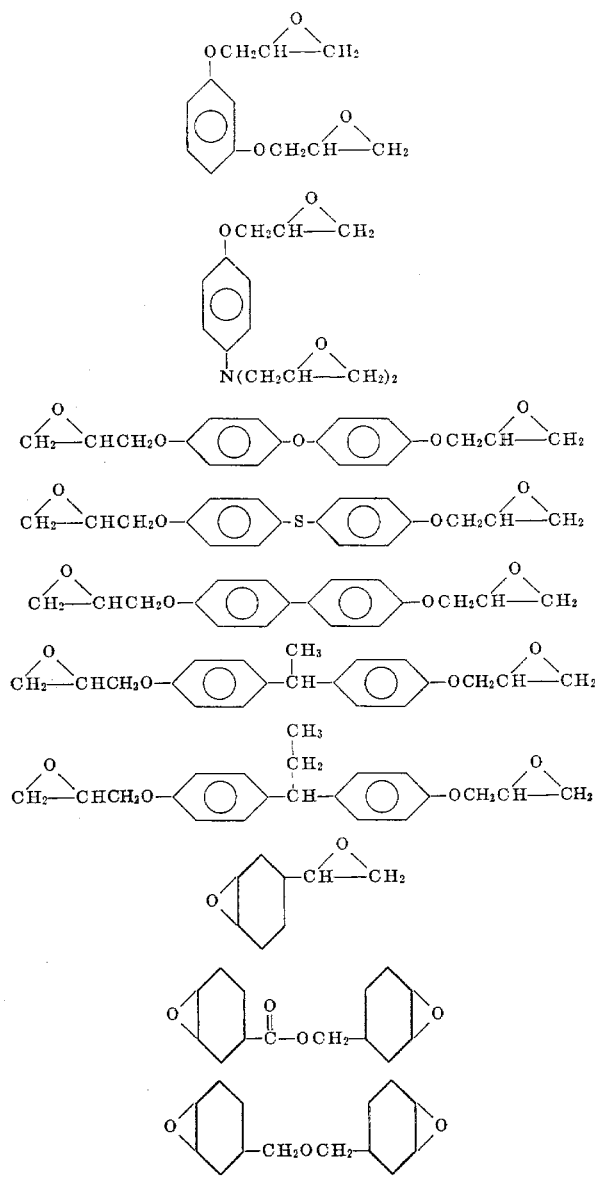

Under proper conditions and with certain of the above-mentioned reactants, it may be possible to produce the products of this invention without a catalyst. However if a sufficient amount of a suitable catalyst, such as phenol, salicylic acid, lactic acid, or Lewis acids such as boron trifluoride and aluminum trichloride, is used to promote the epoxide ring opening, one will probably obtain a reaction which proceeds to completion more quickly and which produces a higher yield.

Ordinarily, a small amount of catalyst will be required. For example, when about 0.3 mole of diglycidyl ether of bisphenol A was admixed with about 0.6 mole of dioctadecyl amine, it was found that about 0.003 mole of phenol provided satisfactory catalysis of the reaction at a temperature of about 100°C.

The reactants and the catalyst, if one is used, can be admixed in a reaction vessel in any order. Normally, the secondary amine, the epoxide compound and the catalyst will be charged into a reaction vessel, followed by thorough stirring to cause an admixture thereof.

Following the admixture of the reactants and the catalyst, the stirring is continued and sufficient heat is applied to allow the reaction mixture to maintain a suitable temperature until the reaction has gone to completion.

In determining a suitable reaction temperature, several factors should be considered. The optimum temperature will depend on the secondary amine used, the epoxide used, whether a catalyst is used (and if so, the type of catalyst) and the minimum period of time one desires for the reaction. Ordinarily, the temperature will be about 100°C., but may be higher or lower than this depending on the reactants and catalyst, if one is used. Also, care must be exercised that too high a temperature is not used which may cause decomposition of the reactants.

When it has been determined that the reaction has gone to completion, by the use of any suitable technique, such as, for example when analysis reveals that epoxide content is essentially zero, the reaction mixture is allowed to cool to room temperature so that it can be formulated into a composition that can be conveniently added to the wash cycle of a home washer.

Similarly, with the same preferred epoxides there may be reacted the following preferred monocarboxylic acids to prepare preferred active ingredients of the present composition:

| Saturated Carboxylic Acids | Unsaturated Carboxylic Acids |
| --- | --- |
| Palmitic | Oleic |
| Stearic | Linoleic |
| Isostearic | Linolenic |
| Arachidic | Riciuoleic |
| Behenic | |
| Hydrogenated tallow Fatty acids | |

Similarly, preferred active ingredients prepared by reacting alcohols with the above preferred epoxides will utilize alcohols of unsubstituted alkyl or alkenyl with 16–24 carbon atoms in $R_1$, (in $R_1CH_2OH$) or mixtures thereof. As aforementioned, preferably stoichiometric amounts are used so that there is no excess of reactive groups in the softening composition and there is little reason to extract any remaining amines or carboxylic acids or alcohols.

Formulations

Because of the nature of the active ingredient, it is formulated with the surfactant such that the active ingredient remains in the proper balance between deposition on the fabric and affinity for the liquid phase. "Affinity" as used herein does not necessarily refer to chemical affinity but may include any Van Der Walls forces present as a result of active groups in the compounds, but primarily refers to the physical deposition and the rate of deposition of the active ingredients on the fabric, as contrasted to the ability to stay dispersed. This is important especially in a "wash additive" so that the additives have minimal interference with the detergency action or cleaning action of the cleaning agent being used. However, excessive amounts of surfactant, or surfactant which prevents deposition on fabric are unsuitable.

As will be understood to those skilled in the art, an effective amount of each of these ingredients is necessary and degree of softening obtained may be affected by the temperature of the wash water, and other factors such as pH of the wash water and the nature of other materials in the wash water and the like in the intended end use.

The active ingredient can be dispersed with suitable amphoteric, anionic and nonionic emulsifiers. Quaternary surfactants are generally not preferred since they may interfere with detergency.

Surfactants with which formulations may be prepared are alkali salts of N-substituted β-amino propionates (Deriphat series available from General Mills, Inc.), N-cetyl betaine, and C-cetyl betaine, ethoxylated nonyl phenols, polyethylene glycol fatty acid esters, polyoxyethylene fatty alcohol ethers, sorbitan fatty acid esters, alkali salts of fatty acids, sulfates of fatty esters, alkyl aryl sulfonates.

A formulation having, based on the weight of active ingredient between about 10 and 38% and preferably between 10 and 25% by weight of surfactant appears to be most suitable in preferred embodiments for use in home washers under typical warm and hot water washing conditions. Similarly, the amount of softening agent (active ingredient) in the wash water should be between about 5 and 25 gms. of active ingredients per 10 lb. load of clothes, with between about 5 and 10 gms. of active ingredients per 10 lb. load being preferred.

One such formulation is a liquid emulsion comprised of (1) a suitable amount of the reaction product; (2) a sufficient amount of a suitable surfactant that will emulsify the reaction product; (3) a sufficient amount of a viscosity control agent such as polyvinyl alcohol, hydroxy-methyl cellulose and the like; and (4) a sufficient amount of water to allow the resulting formulated liquid emulsion to be poured easily.

This liquid emulsion formulation can have the following compositions:

Composition of Liquid Emulsion Formulation

| | Ingredient | General Composition Ranges (Wt. %) | Preferred Composition Ranges (Wt. %) |
|---|---|---|---|
| (1) | fabric softener of this invention | 1 – 98 | 10 – 40 |
| (2) | suitable surfactant that will cause the emulsion of the fabric softener of this invention | 98 – 2 | 1 – 10 |
| (3) | suitable viscosity control agent | up to about 30 | 5 – 25 |
| (4) | Water | up to about 95 | 40 – 65 |

Another suitable formulation is in powdered form. This formulation can be produced by emulsifying the fabric softener of this invention with a sufficient amount of a suitable surfactant, and if desired, a diluent. This resulting emulsion is then deposited on an inert carrier such as borax, sodium carbonate, sodium bicarbonate, sodium sulfate, phosphates, silicates, clays, salts of nitrilotriacetic acid, water soluble polymers such as acrylate polymers or mixtures of the foregoing.

Particularly useful results are obtained when "puffed" borax is used as the inert carrier. Suitable diluents (which may be used if desired, when the fabric softener-surfactant emulsion is too viscous to be easily deposited on the inert carrier) include water, hexane and "Emersoft 7777" (product of Emery Industries).

This powdered formulation can have the following compositions:

Composition of Powdered Formulation

| | Ingredient | General Composition Ranges (Wt. %) | Preferred Composition Ranges (Wt. %) |
|---|---|---|---|
| (1) | active ingredients of this invention | 5 – 40 | 10 – 30 |
| (2) | suitable surfactant that will cause the emulsion of the fabric softener of this invention | 1 – 15 | 1 – 7 |
| (3) | diluent | 0 – 15 | 1 – 7 |
| (4) | inert carrier | remainder but at least 60% by wt. | 65 – 85 |

Still another suitable formulation results when the fabric softener of this invention is deposited on a "fully built" detergent (i.e. a detergent that has been deposited on an inert carrier (builders) such as borax, sodium carbonate, sodium bicarbonate, sodium sulfate, phosphates, silicates, clays, salts of nitrilotriacetic acid, water soluble polymers such as acrylate polymers or mixtures of the foregoing). Thus, with this formulation, one obtains a convenient powder which contains both the detergent and fabric softener, thereby obviating the need to add additional detergent to the wash water. This invention also includes in its scope a formulation wherein the detergent itself functions as the surfactant which will emulsify the active ingredient in water. Alternatively, some solid material (active ingredient) may be sufficiently finely dispersed with surfactant as to be suitable.

Usually, best results will be obtained if the fabric softener of this invention is emulsified with a sufficient amount of a suitable surfactant and, if desired, a diluent, before deposition on a fully built detergent. Suitable diluents (which may be used if desired, when the fabric softener-surfactant emulsion is too viscous to be easily deposited on the "fully built" detergent) include water, hexane and "Emersoft 7777" (product of Emery Industries).

This detergent/fabric softener formulation can have the following compositions:

Composition of Detergent/Fabric Softener Formulation

| | Ingredient | General Composition Ranges (Wt. %) | Preferred Composition Ranges (Wt. %) |
|---|---|---|---|
| (1) | active ingredients of this invention | 3 – 30 | 5 – 15 |
| (2) | added surfactant | 0.5 – 10 | 0.5 – 3 |
| (3) | diluent | 0 – 10 | 0.5 – 3 |
| (4) | fully built detergent | 60 – 95 | 78 – 92 |

Because of the convenience of a wash addable fabric softener, most users of the fabric softeners of this invention will wish to add them to the wash cycle of a home washer. However, if desired, one may add the above-mentioned liquid formulation or powdered formulation to the rinse cycle of a home washer.

When the active ingredient is a solid at room temperature the solid can be dispersed in a solvent therefore which is then mixed with a surfactant to prepare an emulsifiable composition within the scope of this invention.

As an alternative rinse addable composition, one can either a. quaternarize the fabric softeners of this invention, using standard techniques and known quaternarizing agents, or
b. acidify the fabric softeners of this invention with a sufficient amount of an acid to form an amine salt.

These quaternarized products or amine salts, since they should have sufficient solubility, can then be added to the rinse cycle of a home washer.

The reaction giving rise to the active ingredient having alkalene oxide groups of this invention can be carried out according to the methods described in British Pat. No. 271,169 issued 1926, U.S. Pat. No. 1,970,578 issued 1934, and pages 86–141 of the text "Non-Ionic Surfactants" edited by M. J. Schinck, and published in 1967 by Marcel Dekker, Inc., using suitable oxides and the active ingredient of this invention where Q is (—OH) as starting materials.

This invention also comprehends those embodiments in which other agents or substances such as perfumes, optical brighteners, dyes, etc. hereinafter called adjuncts are also deposited simultaneously with the deposition of the active ingredient and in which the active ingredient may enhance the deposition and retention of such substances onto the materials being washed.

Adjunct materials are soluble in, dispersible in or associated with the active ingredient so as to be deposited on a washed article with the active ingredient thereby imparting the adjunct characteristics to the washed article.

As examples of adjuncts useful as optical brighteners there can be mentioned derivatives of benzimidazolyl, aminocumarin, pyrazoline, bisbenzooxazolyl, naphthoxazolyl, and naphthotriazolyl.

Adjuncts having antimicrobial or antibacterial activity or adjuncts useful as sunscreens include those described in Parran U.S. Pat. No. 3,489,686 issued Jan. 13, 1970.

As examples of adjuncts useful as oil repellents and stain repellents there can be mentioned the non-quaternized compounds described in Van der Linde U.S. Pat. application Ser. No. 823,135, filed May 8, 1969, now abandoned and Fasick U.S. Pat. No. 3,282,905 issued Nov. 1, 1966, the disclosures of which are hereby incorporated by reference.

Further softening agents may also be used as adjuncts whose retention on the fabric according to one embodiment of this invention is enhanced by the presence of the active ingredient of the presently claimed composition.

It may be desirable to use such softener adjuncts, i.e. the above mentioned substances, because they may be less expensive than the active ingredient or they may, in conjunction with the active fabric softener, produce a softening effect that is more desirable than that produced by the active ingredient alone.

Such softener adjuncts to be retained on the article being washed should be soluble in, dispersible in, or be capable of becoming associated with the fabric softener of the composition of this invention, and preferably such substances are also water insoluble or sparingly water soluble.

Generally, such softener adjuncts are any substance that if adhered to the article being washed, will impart a soft feel thereto.

Esters of fatty acids are one form of softener adjunct. Preferably, the fatty acid will have a carbon chain of at least $C_{16}$. No particular benefits are believed to result if the fatty acid has greater than about $C_{22}$, although fatty acids of greater than $C_{22}$ may be used under some conditions if desired. The alcohol used to form the ester can be monofunctional, difunctional or trifunctional or of even higher functionality and can have between one and 18 carbon atoms. As examples of such esters there can be mentioned esters of palmitic, stearic or oleic acids with alcohols of $C_1$–$C_{18}$ such as methyl stearate, butyl stearate, glycerol triolate and the like, esters of tall oil fatty acids such as propyl esters of tall oil fatty acids, sorbitan fatty acid esters such as sorbitan monooleate, sorbitan trioleate, etc.

Mineral oil can also be used as a fabric softener adjunct.

Under most circumstances, the active ingredient of the fabric softener of this invention should be intimately admixed with the adjunct so that it (the adjunct) can become dispersed in, dissolved in, or become associated with the fabric softener. This can be done by mixing together the fabric softener, adjunct, and additives previously described used to produce a formulated composition, i.e. surfactants, diluents, detergents, carriers and the like. With some types of adjuncts however, it may be desirable to first admix the fabric softener and the adjunct, to insure that it (the adjunct) becomes dissolved in, dispersed in or becomes associated with the fabric softener. To the resulting admixture can then be added the other previously described additives used to produce a formulated composition.

The amount of adjunct used in conjunction with the fabric softener can vary greatly depending on the nature of the adjunct used. In general, one should use enough adjunct so that a sufficient amount of the adjunct is retained on the washed article to impart thereto the degree of characteristics of the adjunct desired. As will be appreciated by those skilled in the art, it is quite difficult to define precisely the ranges of the amounts of adjuncts. At the present time, however, it is believed that the amount of adjunct used can be from about 0.5% to about 200–300% or even more. Often the adjunct will be no more than about 100% and under many conditions will be about 0.5% to 50% (all of the foregoing percentages being by weight, based on the weight of fabric softener).

If desired a liquid formulation i.e. the fabric softener with suitable emulsifiers, diluents, surfactants, fully built detergents, etc., and if desired inert carriers and/or adjuncts can be spray dried to produce a dry powder.

Suitable specific formulations are tabulated below.

In each of the formulations the active ingredient is the reaction product of Armeen 2HT and diglycidyl ether of bisphenol A as in Example 1.

| Powdered Softener | (1) Weight % | (2) Weight % |
|---|---|---|
| Active Softener | 21.85 | 8.53 |
| Mineral Oil | — | 6.00 |
| Surfactant Aqu. Sol. containing 25 wt. % of N-cetyl betaine | 3.66 | 0.96 |
| Polyethylene glycol fatty acid ester ("Emersoft 7777") | 2.43 | 0.65 |
| Perfume | 0.11 | 0.06 |
| Low density Sodium Carbonate (Flozan) | | |

-Continued

| Powdered Softener | (1) Weight % | (2) Weight % |
|---|---|---|
| Diamond alkali | 71.95 | 83.80 |
| | 100.00 | 100.00 |

| | (3) Weight % |
|---|---|
| Active Softener | 8.35 |
| Mineral Oil | 2.00 |
| Surfactant Aqu. Sol. containing 25 wt.% of N-cetyl betaine | 0.96 |
| Polyethylene glycol "Emersoft fatty acid ester 7777" | 0.65 |
| High Absorption sodium sulfate (FMC Corp.) | 88.04 |
| | 100.00 |

| Detergent Softener | (4) |
|---|---|
| Active Softener | 7.36 |
| Mineral Oil | 1.73 |
| Surfactant Aqu. Sol. containing 25 wt.% of N-cetyl betaine | 0.84 |
| Polyethylene glycol fatty acid ester | 0.57 |
| Cold Power (Colgate-Palmolive) | 89.50 |
| | 100.00 |

| Softener Packaged in a Water Soluble Film | (5) |
|---|---|
| Active Softener | 21.2 |
| Mineral Oil | 14.8 |
| Surfactant as above | 2.4 |
| Polyethylene glycol fatty acid ester | 1.6 |
| Detergent Grade Soda Ash (FMC Corp.) | 60.0 |
| | 100.0 |

45 grams of this formulation was packaged into 150 gauge water soluble polyvinyl alcohol film (Reynold Metals Co.)

All powdered formulations were prepared by a method described in Example 2.

In the Examples which follow, all parts are by weight unless otherwise indicated.

EXAMPLE 1

The following reactants were charged into a three necked, 1 liter flask equipped with thermometer, condenser, stirrer and nitrogen inlet (with drying tube): 112 grams (0.3 mole) of diglycidyl ether of Bisphenol A ("DER 331" available from Dow Chemical Company), 328 grams (0.6 mole) of dioctadecyl amine ("Armeen 2HT" available from Armour Industrial Chemical Company), and 0.3 gram (0.003 mole) of phenol. These reactants were then thoroughly admixed. Following this, the temperature was raised to about 100°C. while stirring was continued. This temperature, along with vigorous stirring, was maintained for about 3 hours, after which the reaction mixture was allowed to cool to room temperature.

The above reaction product was then admixed with a surfactant, viscosity control agent, and water to form a liquid emulsion formulation having the following composition:

| Ingredient | Weight % |
|---|---|
| (1) Reaction Product | 26.56 |
| (2) Surfactant – aqueous solution containing 34 wt. % of C-cetyl betaine | 3.41 |

-Continued

| Ingredient | Weight % |
|---|---|
| (3) Viscosity Control Agent – aqueous solution containing 4 wt. % of polyvinyl alcohol | 15.92 |
| (4) Water | 54.11 |
| | 100.00 |

When about 30 to 60 grams of the above emulsion was added to the wash cycle of a home washer, in the presence of "Tide" and "Clorox," the fabric so treated was found to be softer to the touch than fabric that was washed with Tide and Clorox alone.

EXAMPLE 2

486 grams of the reaction product prepared according to the procedure of Example 1 was admixed with 81.5 grams of a 25 weight percent aqueous solution of N-cetyl betaine, 54 grams of Emersoft 7777 (available from Emery Industries), and 6.1 grams of a perfume to form an aqueous solution.

Puffed borax (available from Wink Corporation) in the amount of 1758 grams was placed in a "Twin Shell Blender" (Patterson Kelly Co., Inc.). The blender was started and then the above-mentioned emulsion was added slowly via a variable discharge pump. The total time of addition was about 10 minutes. Following the addition, the product was allowed to tumble for an additional 10 minutes.

Standard soiled cotton fabric (available from Test Fabric Inc.) was cut into 4 inch by 4 inch swatches. A total of 25 grams of these swatches were then washed in a "Terg-O-Tometer" at 150 revolutions per minute, using 1 liter of water, 2.5 grams of "Tide XK" (Procter and Gamble Co.), and 1.1 grams of the above powdered formulation.

Standard soiled cotton fabric was also washed under the same conditions in the presence of 2.5 grams of Tide XK. The results are summarized as follows:

| | Detergency ($\Delta R$) | Softness |
|---|---|---|
| "Tide XK" Control | 11.0 | Very harsh |
| "Tide XK" plus 1.1 grams of the powdered formulation of Example 2 | 12.8 | Good |

Softness was rated as very harsh, harsh, fair or good, as determined by averaging the findings made by a panel of testers.

The reading designated Detergency ($\Delta R$) is the difference between the percent green reflectance of the washed fabric and percent green reflectance of the soiled, unwashed fabric. These reflectance readings were taken with a Hunter Laboratory Model D40 Reflectometer.

Thus, $\Delta R$ is a measure of the effectiveness of the detergent used in the washing operation, since fabric that is thoroughly cleaned will exhibit a greater reflectance than fabric that is still partially soiled. As can be seen from the above results, the soiled fabric washed with Tide XK and the powdered formulation of this example exhibits a greater $\Delta R$ than soiled fabric washed with Tide XK alone. Hence, it is evident that the fabric softener of this invention does not interfere with the effectiveness of the detergent used in the washing operation.

EXAMPLE 3

240 grams of the reaction product produced according to the procedure of Example 1 was admixed with 42 grams of a 25 weight percent aqueous solution of N-cetyl betaine, and 27 grams of Emersoft 7777 (available from Emery Industries) to form an emulsion. Tide XK (Procter and Gamble Co.) in the amount of 1800 grams was placed in a Twin Shell Blender (Patterson Kelly Co., Inc.). The blender was started and then the above-mentioned emulsion was added slowly via a variable discharge pump. The total time of addition was about 10 minutes. Following the addition, the product was allowed to tumble for an additional 10 minutes.

When 68 grams of the above formulation was added to the wash cycle of a home washer, the fabric so treated was found to be softer to the touch than fabric that was washed with Tide XK alone.

The detergency ($\Delta R$) of the detergent/fabric softener formulation was evaluated by using the technique and conditions of Example 2. The results are summarized as follows:

|  | Detergency ($\Delta R$) |
| --- | --- |
| Control – 1.8 grams of "Tide XK" | 24.7 |
| 2.1 grams of "Tide XK"/ fabric softener formulation of Example 3 | 24.0 |

Hence, it is evident that the fabric softener of this invention does not interfere, to any significant degree, with the effectiveness of the detergent used in the washing operation.

EXAMPLE 4

Using the procedure of Example 1, 100 grams (0.588 mole of epoxy) of polyglycidyl ether of phenol formaldehyde resin ("ERL-3794" available from Union Carbide Corp.) and 312.6 grams (0.6 mole) of dioctadecyl amine (Armeen 2HT available from Armour Industrial Chemical Co.) were reacted in the presence of 2.5 grams (0.03 mole) of phenol.

After cooling, the reaction product, using the procedure of the foregoing examples, (a) can be combined with other suitable compounds to produce a convenient formulation and (b) can be used to soften fabric.

EXAMPLE 5

Using the procedure of Example 1, 20.8 grams (0.075 mole) of triglycidyl ether of p-amino phenol ("ERL-0500" available from Union Carbide Corporation) and 117.2 grams (0.225 mole) of dioctadecyl amine (Armeen 2HT available from Armour Industrial Chemical Co.) were reacted in the presence of 0.70 gram (0.015 mole) of phenol.

After cooling, the reaction product, using the procedure of the foregoing examples, (a) can be combined with other suitable compounds to produce a convenient formulation and (b) can be used to soften fabric.

EXAMPLE 6

Using the procedure of Example 1, 10.6 grams (0.05 mole) of diglycidyl ether of resorcinol ("ERE 1359" available from Ciba Corporation) and 52.1 grams (0.016 mole) of dioctadecyl amine (Armeen 2HT available from Armour Industrial Chemical Co.) were reacted in the presence of 0.47 gram (0.005 mole) of phenol.

After cooling, the reaction product, using the procedure of the foregoing examples, (a) can be combined with other suitable compounds to produce a convenient formulation and (b) can be used to soften fabric.

EXAMPLE 7

300 grams of the reaction product produced according to the procedure of Example 1 was dried under a nitrogen atmosphere by first heating to about 120°C. and then cooling to about 80°C. While the nitrogen atmosphere and the temperature of 80°C. was maintained, 1 gram of a 50% by weight dispersion of sodium hydride catalyst in mineral oil was added followed by addition of ethylene oxide.

After addition of 89.5 grams of ethylene oxide, one half of the reaction mixture was removed and the catalyst neutralized with 0.6 cubic centimeters of acetic acid.

The remaining reaction mixture was further ethoxylated by addition of about 27 grams of ethylene oxide. The catalyst was neutralized with about 0.6 cubic centimeters of acetic acid.

Following cooling, the above ethoxylated products can be used to soften fabric, by adding a suitable amount of them to the wash cycle of a home washer.

EXAMPLE 8

8.36 parts of the reaction product prepared according to the procedure of Example 1 were admixed with 4.10 parts of methyl stearate, 0.63 parts Emersoft 7777, 5.90 parts of mineral oil and 0.94 parts of a 25 weight percent aqueous solution of N-cetyl betaine.

Using the procedure of Example 2 the above admixture was deposited on 80.07 parts of particles of low density sodium carbonate.

115 grams of the above admixture deposited on sodium carbonate, along with 90 grams of Tide XK, were used to wash about 4 pounds of cotton towels in about 60 liters of water. These cotton towels were found to be softer to the touch than cotton towels washed with Tide XK and substantially the same above admixture deposited on sodium carbonate but without the methyl stearate.

An admixture was made of 12.46 parts methyl stearate, 0.94 parts of a 25 weight percent aqueous solution of N-cetyl betaine, 0.63 parts of Emersoft 7777, and 5.9 parts mineral oil. This admixture was deposited on 80.07 parts of particles of low density sodium carbonate, and 115 grams of the resulting powder, along with 90 grams of Tide XK were used to wash about 4 pounds of cotton towels in about 60 liters of water. No noticeable softening effect was produced.

EXAMPLE 9

20.4 parts of the reaction product prepared according to the procedure of Example 1 were admixed with 5.85 parts of a 25 weight percent solution of N-cetyl betaine, 0.59 parts of "Monastral Blue BWD" (a pigment that is soluble in the reaction product, available from E. I. du Pont de Nemours and Company), and 73.16 parts of water.

100 grams of the above admixture along with 90 grams of Tide XK were used to wash about 4 pounds of cotton towels in about 60 liters of water. The resulting towels were dyed blue.

No dyeing was produced when the pigment and reaction product were added separately to the wash water.

EXAMPLE 10

A 250 ml. round bottom flask containing 22.6 g. (0.060 mol) diglycidyl ether of bisphenol A ("DER 331" available from Dow Chemical Company) and 34.2 g. (0.12 mol) of reagent grade stearic acid and 0.128 g. (0.22% by weight of the reactants) reagent grade crushed potassium hydroxide was heated to 125°C. and held at about that temperature for two hours with vigorous stirring after which it was held at 120°C. for six hours with additional stirring. The reaction was found to be complete by infrared analysis. 18.0 grams of the ester so prepared was dispersed with 2.5 g. "Renex" 697 (trade name for ethoxylated nonyl phenyl) in petroleum ether (boiling point range 30°–60°) acetone solution and the mixture of ester and dispersing agent was deposited on 30 g. of puffed Borax by evaporation of solvent.

This amount of formulation was used with about 180 g. of "All" (Lever Brothers) added to a home washer in the wash cycle while washing a load of 30 hand towels in warm water.

In a similar wash, All detergent was used with 49 g. of a formulation containing 10.7 g. of active ingredient, 1.8 g. of 25 weight percent aqueous solution of N-cetyl betaine, 1.2 g. of Emersoft 7777 and 35.3 g. of sodium carbonate. The active ingredient was of the dioctadecyl amine adduct of the same epoxide above. A similar softening effect was observed for both washes.

What is claimed is:

1. A composition for the simultaneous washing and softening of fabrics, consisting essentially of (A) at least one compound of the formula

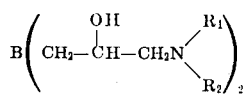

where
   B is an alkylene radical of 10–20 carbon atoms, an aryl radical of 1–10 benzene rings; an —O—Y—O— radical or a

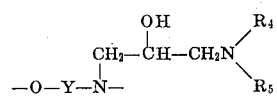

radical
   where
   Y is an alkylene radical of 10–20 carbon atoms or an aryl radical of 1–10 benzene rings, and
   $R_4$ and $R_5$ are alkyl or alkenyl radicals of 13–40 carbon atoms; and
   $R_1$ and $R_2$ are alkyl or alkenyl radicals of 13–40 carbon atoms; and (B) 10–38%, by weight of (A), of an amphoteric, anionic or non-ionic surfactant.

2. The composition of claim 1 where, in the compound of (A), B is

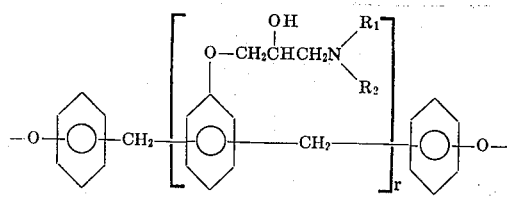

where
   $R_1$ and $R_2$ are alkyl or alkenyl of 13–40 carbon atoms, and
   $r$ is 0–5.

* * * * *